United States Patent
Yasuda

(10) Patent No.: US 8,686,293 B2
(45) Date of Patent: Apr. 1, 2014

(54) SILANE-CROSSLINKED POLYOLEFIN INSULATED WIRE

(75) Inventor: Shuhei Yasuda, Hitachi (JP)

(73) Assignee: Hitachi Cable, Ltd., Tokyo (JP)

( * ) Notice: Subject to any disclaimer, the term of this patent is extended or adjusted under 35 U.S.C. 154(b) by 183 days.

(21) Appl. No.: 13/424,910

(22) Filed: Mar. 20, 2012

(65) Prior Publication Data

US 2012/0312580 A1  Dec. 13, 2012

(30) Foreign Application Priority Data

Jun. 9, 2011  (JP) ................. 2011-129198

(51) Int. Cl.
*H01B 3/44*  (2006.01)
*H01B 3/30*  (2006.01)

(52) U.S. Cl.
USPC ........... 174/110 PM; 174/110 R; 174/110 SR

(58) Field of Classification Search
USPC ............... 174/110 PM, 110 R, 110 SR
See application file for complete search history.

(56) References Cited

U.S. PATENT DOCUMENTS

2008/0227887 A1*  9/2008  Klier et al. .................. 523/173
2009/0145627 A1*  6/2009  Frigerio et al. ......... 174/110 PM

FOREIGN PATENT DOCUMENTS

JP    2002-146150 A    5/2002

* cited by examiner

*Primary Examiner* — Timothy Thompson
*Assistant Examiner* — Sherman Ng
(74) *Attorney, Agent, or Firm* — Roberts Mlotkowski Safran & Cole P.C.

(57) ABSTRACT

A silane-crosslinked polyolefin insulated wire includes a conductor, and an insulating cover layer extruded on an outer periphery of the conductor. The insulating cover layer includes a silane-crosslinked polyolefin to be cross-linked by reacting water with a polyolefin having an alkoxysilyl group as a side chain. The insulating cover layer further includes a guanidine derivative having a boiling point of not less than 170° C. and a melting point of less than 190° C. in an environment at 760 mmHg as a crosslinking promoter to promote crosslinking of the polyolefin in an amount of not less than 0.05 parts by mass and not more than 0.5 parts by mass per 100 parts by mass of the polyolefin.

4 Claims, 1 Drawing Sheet

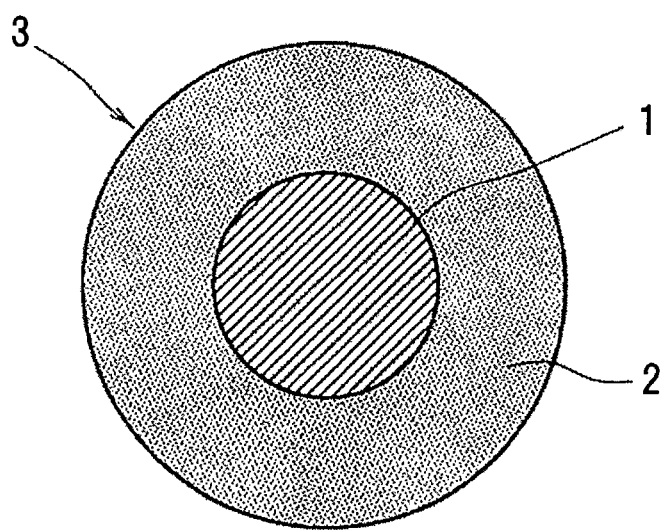

SILANE-CROSSLINKED POLYOLEFIN INSULATED WIRE

The present application is based on Japanese patent application No. 2011-129198 filed on Jun. 9, 2011, the entire contents of which are incorporated herein by reference.

BACKGROUND OF THE INVENTION

1. Field of the Invention

The invention relates to a silane-crosslinked polyolefin insulated wire and, in particular, to a silane-crosslinked polyolefin insulated wire that the silane-crosslinked polyolefin is prepared by a crosslinking reaction using a new crosslinking promoter instead of an organotin compound that may cause adverse effect as an environmental hormone.

2. Description of the Related Art

A widely used electric wire is provided with an insulating cover layer that is prepared such that a graft copolymer obtained by graft-copolymerizing an organic silane compound to a polyolefin such as polyethylene, ethylene-vinyl acetate copolymer and ethylene-propylene copolymer, in the presence of a free radical generator, or a copolymer of polyethylene and vinylsilane compound is molded into a predetermined shape, and is reacted with water in the presence of a silanol catalyst to produce, as the insulating cover layer, the molded material with molecules crosslinked each other.

This crosslinking method called "silane-water crosslinking" is characterized in that a small amount of organic peroxide is caused to act as a grafting initiator on the polyolefin in a processing equipment such as an extruder to graft-copolymerize a silane compound such as vinyl alkoxysilane to the polyolefin, and the molded material discharged from the processing equipment is then exposed to high temperature and high humidity or to hot water to cause the crosslinking reaction.

The crosslinking reaction is completed by the hydrolysis and condensation reaction of alkoxysilane by the aid of a silanol condensation catalyst (typically an organotin compound) that is preliminarily mixed into the molded material or infiltrated through the surface of the molded material. In other words, the reaction is based on that alkoxysilane graft-copolymerized to the polymer is subjected to the hydrolysis and condensation reaction to bond the polymer molecules each other to promote the crosslinking. The crosslinking method is easier and less costly on facility basis and on process basis than a so-called chemical crosslinking method in which only the organic peroxide is used for crosslinking. Therefore, it is the most suitable crosslinking method of a molded material such as an insulating coating of, especially, an electric wire/cable.

SUMMARY OF THE INVENTION

However, the molded material obtained by the conventional silane crosslinking method may cause safety issues in the future since there is concern about the environmental hormone due to the organotin compound used as a silanol condensation catalyst. That is, among the organotin compounds, triphenyltin and tributyltin have been already designated as hazardous substances causing environmental hormone problems which disrupt endocrine function of human body. Thus, a dibutyltin compound, which is similar to the above compounds and is often used as the silanol condensation catalyst for silane water-crosslinking, can be designated as well.

As a solution thereof, Japanese patent No. 3656545 discloses a method that metal carboxylate salt such as cobalt, titanium, zinc and aluminum is used as a catalyst in place of the dibutyltin compound. However, these metals can promote the oxidation degradation of a polymer compound. Therefore, it is desirable that the metal compounds are not contained in polymeric materials such as a wire insulation which is required to have a heat-aging property.

Furthermore, in recent years, the simplification of manufacturing process/facility is further needed, and the crosslinking characteristics are needed to be sufficiently obtained only by being left in a room temperature atmosphere without being exposed to high temperature and humidity or to hot water.

Accordingly, it is an object of the invention to provide a silane-crosslinked polyolefin insulated wire using an alternative crosslinking promoter instead of a possibly harmful organotin compound and having the same crosslinking rate as the organotin compound.

(1) According to one embodiment of the invention, a silane-crosslinked polyolefin insulated wire comprises:

a conductor; and an insulating cover layer extruded on an outer periphery of the conductor, wherein the insulating cover layer comprises a silane-crosslinked polyolefin to be cross-linked by reacting water with a polyolefin having an alkoxysilyl group as a side chain, and wherein the insulating cover layer further comprises a guanidine derivative having a boiling point of not less than 170° C. and a melting point of less than 190° C. in an environment at 760 mmHg as a crosslinking promoter to promote crosslinking of the polyolefin in an amount of not less than 0.05 parts by mass and not more than 0.5 parts by mass per 100 parts by mass of the polyolefin.

In the above embodiment (1) of the invention, the following modifications and changes can be made.

(i) The boiling point of the guanidine derivative is not less than 200° C. in an environment at 760 mmHg.

(ii) A gel fraction of the insulating cover layer is not less than 70%.

Effects of the Invention

According to one embodiment of the invention, a silane-crosslinked polyolefin insulated wire can be provided that uses an alternative crosslinking promoter instead of a possibly harmful organotin compound and has the same crosslinking rate as the organotin compound.

BRIEF DESCRIPTION OF THE DRAWINGS

Next, the present invention will be explained in more detail in conjunction with appended drawings, wherein:

FIG. 1 is a cross sectional view showing a configuration example of a silane-crosslinked polyolefin insulated wire of the present invention.

DETAILED DESCRIPTION OF THE PREFERRED EMBODIMENTS

A preferred embodiment of the invention will be described in detail below in conjunction the appended drawing.

Firstly, a configuration example of a silane-crosslinked polyolefin insulated wire of the invention will be explained in reference to FIG. 1.

In FIG. 1, a silane-crosslinked polyolefin insulated wire 3 is composed of a conductor 1 and a silane-crosslinked polyolefin insulating cover layer 2 formed thereon.

The silane-crosslinked polyolefin insulating cover layer 2 is formed of silane-crosslinked polyolefin which is crosslinked by causing water to act on polyolefins having an alkoxysilyl group as a side chain and in which a guanidine derivative having a boiling point of not less than 170° C. and a melting point of less than 190° C. in an environment at 760 mmHg (in an atmospheric pressure environment) is mixed as a crosslinking promoter for promoting crosslinking of the polyolefin in an amount of not less than 0.05 parts by mass and not more than 0.5 parts by mass per 100 parts by mass of the polyolefin.

It is preferable that the boiling point of the guanidine derivative be not less than 200° C. in an environment at 760 mmHg and that a gel fraction of the silane-crosslinked polyolefin insulating cover layer 2 be not less than 70%.

Since the guanidine derivative has a high basicity due to its structure and high reactivity as a crosslinking catalyst, a crosslinking rate equivalent to that of an organotin compound is obtained without using the organotin compound which is regarded as an environmental problem.

In the invention, the reason why the used amount of the guanidine derivative as a crosslinking promoter is limited to not less than 0.05 parts by mass and not more than 0.5 parts by mass per 100 parts by mass of the polyolefin is that less than 0.05 parts by mass is not a sufficient amount to crosslink molecules of polyolefin while more than 0.5 parts by mass of the guanidine derivative causes a crosslinking reaction too early in a processing equipment such as an extruder, which results in that a molded material with good appearance is not obtained.

In addition, the boiling point of the guanidine derivative usable as a crosslinking promoter is limited to not less than 170° C. in the invention because a preset temperature of a processing equipment such as an extruder is often adjusted to about 160° C. to 220° C. for manufacturing a silane-crosslinked polyolefin insulated wire and also the temperature of polyolefins is increased by shear heating in the processing equipment, and thus, if the boiling point of the guanidine derivative is less than 170° C., the guanidine derivative is evaporated at an outlet port of the processing equipment, the amount thereof becomes insufficient to crosslink the molecules and the evaporation generates air-bubbles (voids) in an insulating cover layer, which adversely affects insulating characteristics of an electric wire.

Meanwhile, the reason why the melting point of the guanidine derivative usable as a crosslinking promoter is limited to less than 190° C. is that a material of an insulating cover layer is not uniformly kneaded in an extrusion step when higher than 190° C. and, if the guanidine derivative is not uniformly dispersed in the material of the insulating cover layer, the crosslinking of polyolefins after molding is not sufficient.

Furthermore, the boiling point of the guanidine derivative in an environment at 760 mmHg is preferably not less than 200° C. This is because, when a guanidine derivative having a boiling point of not less than 200° C. which is higher than the grafting reaction temperature of a silane compound is used as a crosslinking promoter, a graft reaction of a silane compound with polyolefin caused by supplying an additive containing a silane compound, a crosslinking promoter and a radical initiator to polyolefin in an extruder and extrusion molding of a wire (cable) can be simultaneously performed in one extruder.

When the preset temperature of the extruder is, e.g., 200° C., it is possible to use a guanidine derivative having a boiling point of not less than 200° C. and a melting point of less than 190° C. It is more preferable to use a guanidine derivative having a boiling point of not less than 200° C. and a melting point of less than 180° C.

When the preset temperature of the extruder is 160° C., a guanidine derivative having a boiling point of not less than 170° C. and a melting point of less than 160° C. can be used as a crosslinking promoter. It is more preferable to use a guanidine derivative having a boiling point of not less than 170° C. and a melting point of less than 150° C.

In a step of extruding the insulating cover layer as a wire (cable) covering material on a conductor, the temperature of the extruder is adjusted to about 160° C. to 200° C. as described above. However, when the preset temperature of the extruder at the time of coating is 160° C., it is lower than a temperature to generate a radical which initiates a graft reaction of a silane compound with polyolefin. Therefore, this case does not require a one step process in which the graft reaction and the extrusion molding of a wire (cable) are simultaneously performed in one extruder, but requires two steps, a first step of initially making a polyolefin having an alkoxysilyl group as a side chain by a graft reaction in another extruder set to a temperature suitable for reacting a silane compound with polyolefin and a second step of mixing the polyolefin having an alkoxysilyl group as a side chain with a guanidine derivative under the above-mentioned conditions and extrusion-coating a conductor therewith.

The guanidine derivative satisfying the conditions mentioned above include 1,5,7-triazabicyclo[4.4.0]dec-5-ene, 7-methyl-1,5,7-triazabicyclo[4.4.0]dec-5-ene, N,N-diphenylguanidine (mp=147° C. and bp=170° C.), N,N'-di-o-tolylguanidine (mp=175° C. and bp=384° C.), 1,2,3-triphenylguanidine and 1-(o-tolyl)biguanide (mp=144° C. and bp>200° C.), etc., but it is not limited thereto.

As a polyolefin, it is possible to use polyethylene polymerized by an ionic polymerization technique, polyethylene polymerized by a radical polymerization technique or a polymeric material consisting mainly of polyethylene as a mixture of the ion polymerized polyethylene and the radical polymerized polyethylene. In addition to these polyethylenes, it is possible to use ethylene copolymers such as ethylene-ethyl acrylate copolymer, ethylene-vinyl acetate copolymer or ethylene-methacrylate copolymer, etc., a copolymer of propylene and ethylene, or one or more in which a functional group including maleic anhydride or epoxy, etc., is grafted onto polyolefin.

A method of introducing alkoxysilane into polyolefins is, e.g., grafting of vinyl alkoxysilane such as vinyltrimethoxysilane or vinyltriethoxysilane, etc. Then, as a radical generator for graft-copolymerizing these compounds onto polyolefin, organic peroxides such as dicumyl peroxide, 2,5-dimethyl-2,5-di(t-butylperoxy)hexine, 2,5-dimethyl-2,5-(t-butylperoxy)hexane, α,α'-bis(t-butylperoxy-m-isopropyl)benzene, m-(t-butylperoxyisopropyl)-isopropylbenzene and p-(t-butylperoxyisopropyl)-isopropylbenzene, etc., are mainly used.

It is possible to use a combination of two or more radical generators, and the amount thereof added to polyolefin is preferably set to not less than 0.03 parts by mass and not more than 0.15 parts by mass. It is difficult to obtain a sufficient crosslinking rate at the added amount of less than 0.03 parts by mass, on the other hand, more than 0.15 parts by mass is not preferable since voids are generated due to decomposition product of the radical generator.

In addition to the above, polyolefin having an alkoxysilyl group as a side chain is also obtained by copolymerizing polyolefin having an unsaturated bond in a main chain with an alkoxyvinyl silane compound.

In addition, a compounding agent for improving thermal aging resistance, such as an antioxidant, may be added to the above compositions in accordance with the purposes.

As an antioxidant added to improve thermal aging resistance, it is preferable to use one or more selected from 2,2'-thiodiethylene bis[3-(3,5-di-t-butyl-4-hydroxyphenyl)propionate], pentaerythrityl tetrakis[3-(3,5-di-t-butyl-4-hydroxyphenyl)propionate], octadecyl 3-(3,5-di-t-butyl-4-hydroxyphenyl)propionate, 2,4-bis(n-octylthio)-6-(4-hydroxy-3,5-di-t-butyl anilino)-1,3,5-triazin, bis[2-methyl-4-{3-n-alkyl (C12 or C14)-thiopropionyloxy}-5-t-butylphenyl]sulfide and 4,4'-thiobis(3-methyl-6-t-butylphenol). The added amounts thereof are each in a range of not less than 0.05 parts by mass and not more than 0.5 parts by mass per 100 parts by mass of polyolefin.

Meanwhile, an embodiment, in which one or more antioxidants selected from dilauryl thiodipropionate, dimyristyl thiodipropionate, distearylthiodipropionate, ditridecyl thiodipropionate and tetrakis(methylene dodecyl thiodipropionate)methane are combined with the above antioxidants, is also preferable and the added amount is also preferably set to not less than 0.05 parts by mass and not more than 0.5 parts by mass per 100 parts by mass of polyolefin.

When an antioxidant listed in the second group is combined, the anti-aging effect is synergistically improved as compared to the case where an antioxidant listed in the first group is used alone, and furthermore, even metal damage as deterioration of polyolefin caused by contact with metal can be efficiently suppressed.

A method of adding such antioxidants may be dry-blend with polyolefin or addition of a masterbatch in which such antioxidants are mixed with polyolefin at a high concentration.

Alternatively, it is possible to mix the antioxidant with polyolefin in a processing equipment such as an extruder by addition of a silane compound having the antioxidant dissolved therein.

Here, the reason why the added amount of the antioxidant is preferably set to not less than 0.05 parts by mass and not more than 0.5 parts by mass as described above is that satisfactory results are not obtained for the anti-aging effect and for the effect of preventing metal damage in case of being used in a combination when less than 0.05 parts by mass, and precipitation of the antioxidant on the surface of the molded material, so-called blooming, occurs when more than 0.5 parts by mass.

In the invention, there are the following two methods as a means of manufacturing an electric wire (or cable) using the above compositions. That is, one is a method called a two step process or Sioplas (registered trademark) in which a masterbatch prepared so as to contain a high concentration of crosslinking promoter and polyolefin onto which a silane compound is preliminary grafted are supplied to an extruder and extruding molding is then performed, and another is a method called a one step process or Monosil (registered trademark) in which an additive containing a silane compound, a crosslinking promoter and a radical initiator is supplied to polyolefin in an extruder so that a graft reaction of the silane compound with polyolefin and extrusion molding of an electric wire (cable) are simultaneously performed in one extruder.

EXAMPLES

Next, Examples of the silane-crosslinked polyolefin insulated wire in the invention will be described.

Table 1 summarizes details of Examples in the invention and Comparative Examples, and the evaluation of the results thereof.

TABLE 1

| | Items | Examples | | | | | | |
|---|---|---|---|---|---|---|---|---|
| | | 1 | 2 | 3 | 4 | 5 | 6 | 7 |
| Component | Ion polymerized polyethylene (d = 0.992, MI = 2.3 g per 10 minutes) | 100 | 100 | 100 | 100 | 100 | — | 100 |
| | Radical polymerized polyethylene (d = 0.920, MI = 1.0 g per 10 minutes) | — | — | — | — | — | 100 | — |
| | Vinyltrimethoxysilane | 4.0 | 4.0 | 4.0 | 4.0 | 4.0 | 4.0 | 4.0 |
| | Dicumyl peroxide | 0.04 | 0.04 | 0.04 | 0.04 | 0.04 | 0.04 | 0.04 |
| | Pentaerythrityl tetrakis[3-(3,5-di-t-butyl-4-hydroxyphenyl)propionate] | 0.1 | 0.1 | 0.1 | 0.1 | 0.1 | 0.1 | 0.1 |
| | 1-(o-tolyl)biguanide (Nocceler-BG, mp = 144° C., bp > 200° C.) | 0.05 | 0.10 | 0.30 | 0.50 | — | 0.10 | — |
| | N,N'-di-o-tolylguanidine (Nocceler-DT, mp = 175° C., bp = 384° C.) | — | — | — | — | 0.10 | — | — |
| | N,N'-diphenylguanidine (Nocceler-DP, mp = 147° C., bp = 170° C.) | — | — | — | — | — | — | 0.10 |
| | Oleylamine (mp = 15° C., bp = 349° C.) | — | — | — | — | — | — | — |
| | Hardened tallow alkyl propanediamine (mp = 42° C., bp > 200° C.) | — | — | — | — | — | — | — |
| | 1,1,3,3-tetramethylguanidine (mp = −30° C., bp = 161° C.) | — | — | — | — | — | — | — |
| | 1-cyanoguanidine (mp = 207° C., bp > 200° C.) | — | — | — | — | — | — | — |
| | Dibutyltin dilaurylate | — | — | — | — | — | — | — |
| Extrusion temperature [° C.] | | 200 | 200 | 200 | 200 | 200 | 200 | 160 |
| Evaluation | Environmental responsiveness | ○ | ○ | ○ | ○ | ○ | ○ | ○ |
| | Surface appearance of Insulating cover layer | ○ | ○ | ○ | ○ | ○ | ○ | ○ |
| | Generation of voids in Insulating cover layer | N* | N | N | N | N | N | N |

TABLE 1-continued

|  |  | | | | | | | |
|---|---|---|---|---|---|---|---|---|
|  | Gel fraction after vapor crosslinking [%] | 72 | 73 | 72 | 74 | 73 | 72 | 71 |
|  | Gel fraction after room temperature crosslinking [%] | 70 | 72 | 72 | 73 | 71 | 70 | 70 |

| | | Comparative Examples | | | | | | |
|---|---|---|---|---|---|---|---|---|
| | Items | 1 | 2 | 3 | 4 | 5 | 6 | 7 |
| Component | Ion polymerized polyethylene (d = 0.992, MI = 2.3 g per 10 minutes) | 100 | 100 | 100 | 100 | 100 | 100 | 100 |
|  | Radical polymerized polyethylene (d = 0.920, MI = 1.0 g per 10 minutes) | — | — | — | — | — |  |  |
|  | Vinyltrimethoxysilane | 4.0 | 4.0 | 4.0 | 4.0 | 4.0 | 4.0 | 4.0 |
|  | Dicumyl peroxide | 0.04 | 0.04 | 0.04 | 0.04 | 0.04 | 0.04 | 0.04 |
|  | Pentaerythrityl tetrakis[3-(3,5-di-t-butyl-4-hydroxyphenyl)propionate] | 0.1 | 0.1 | 0.1 | 0.1 | 0.1 | 0.1 | 0.1 |
|  | 1-(o-tolyl)biguanide (Nocceler-BG, mp = 144° C., bp > 200° C.) | — | — | — | 0.03 | 0.55 | — | — |
|  | N,N'-di-o-tolylguanidine (Nocceler-DT, mp = 175° C., bp = 384° C.) | — | — | — | — | — |  |  |
|  | N,N'-diphenylguanidine (Nocceler-DP, mp = 147° C., bp = 170° C.) | — | — | — | — | — |  |  |
|  | Oleylamine (mp = 15° C., bp = 349° C.) | — | 0.05 | — | — | — | — | — |
|  | Hardened tallow alkyl propanediamine (mp = 42° C., bp > 200° C.) | — | — | 0.05 | — | — | — | — |
|  | 1,1,3,3-tetramethylguanidine (mp = −30° C., bp = 161° C.) | — | — | — | — | — | 0.05 | — |
|  | 1-cyanoguanidine (mp = 207° C., bp > 200° C.) | — | — | — | — | — | — | 0.05 |
|  | Dibutyltin dilaurylate | 0.05 | — | — | — | — | — | — |
| Extrusion temperature [° C.] |  | 200 | 200 | 200 | 200 | 200 | 200 | 200 |
| Evaluation | Environmental responsiveness | X | ○ | ○ | ○ | ○ | ○ | ○ |
|  | Surface appearance of Insulating cover layer | ○ | ○ | ○ | ○ | X | ○ | ○ |
|  | Generation of voids in Insulating cover layer | N | N | N | N | N | G* | N |
|  | Gel fraction after vapor crosslinking [%] | 75 | 70 | 72 | 70 | 76 | 65 | 67 |
|  | Gel fraction after room temperature crosslinking [%] | 75 | 59 | 63 | 66 | 72 | 59 | 62 |

*N: not generated,
*G: generated
(Blending unit: parts by mass)

Examples 1 to 6 and Comparative Examples 1 to 7 in Table 1 are examples of silane-crosslinked polyolefin insulated wire manufactured in the one step process, in which polyethylene is introduced into a 130 mm-extruder at 200° C. while vinyltrimethoxysilane in which dicumyl peroxide as a radical generator and pentaerythrityl tetrakis[3-(3,5-di-t-butyl-4-hydroxyphenyl)propionate] as an antioxidant are dissolved is injected through a lower portion of a hopper of the extruder and a specified guanidine derivative in Examples, or a non-specified guanidine derivative or other catalyst compounds in Comparative Example, is introduced as a catalyst to simultaneously perform extruding molding of a cable and graft copolymerization of a silane compound onto polyethylene, thereby making a silane-crosslinked polyolefin insulated wire.

Meanwhile, Example 7 in Table 1 is an example of silane-crosslinked polyolefin insulated wire manufactured in the two step process, in which polyethylene introduced in a 40 mm-extruder at 200° C. and vinyltrimethoxysilane, in which dicumyl peroxide as a radical generator and pentaerythrityl tetrakis[3-(3,5-di-t-butyl-4-hydroxyphenyl) propionate] as an antioxidant are dissolved and which is injected through a lower portion of a hopper of the extruder, are extruded to make pellets of a silane grafted polymer having methoxysilane in a side chain, and subsequently, the pellets of the obtained silane grafted polymer having methoxysilane in a side chain and a catalyst masterbatch in pellet form made of polyethylene with a high concentration of guanidine compound kneaded therein are blended at a defined blending ratio and are supplied to a 130 mm-extruder at 160° C. and extruding molding of an insulated wire is then performed, thereby making a silane-crosslinked polyolefin insulated wire.

This insulated wire has a structure shown in FIG. 1, in which a size of the conductor 1 as a soft copper twisted wire is 38 mm$^2$ and a thickness of the silane-crosslinked polyolefin insulating cover layer 2 is 1.2 mm.

For evaluation of environmental responsiveness, the samples not containing a substance potentially causing an effect of environmental hormone in the mixture composition are judges as good quality and are indicated by "○ (circle)" in Table 1, and the sample containing such a substance is judged as poor quality and is indicated by "X (cross)"

The extrudability evaluation is a result of visually observing a surface of the extruded insulating cover layer, where "○ (circle)" indicates good quality and "X (cross)" indicates poor quality with a roughness like a rough skin.

In addition, it is judged as good quality when air-bubbles or voids are not generated in the insulating cover layer observed near the outlet port of the extruder and it is judged as poor quality with the generation thereof. The presence thereof is shown in Table 1.

Next, a gel fraction of the insulating cover layer was measured according to JIS C 3005 after leaving the insulated wire in an atmosphere at 80° C. and 95% RH for 24 hours or in an atmosphere at 25° C. and 65% RH for 7 days. Not less than 70% of gel fraction is judged as good quality and less than 70% is judged as poor quality.

According to Table 1, all of Examples 1 to 7, in which a guanidine derivative having a boiling point of not less than 170° C. and a melting point of less than 190° C. in an environment at 760 mmHg is blended as a crosslinking promoter in the amount of not less than 0.05 parts by mass and not more than 0.5 parts as defined in the invention, are good in extrudate appearance and a gel fraction after vapor crosslinking or room temperature crosslinking, and it is shown that excellent characteristics allowing to be an alternative to organotin compound catalysts which have been used very often thus far are exhibited.

This is a crosslinked molded material which does not raise concern about environmental hormone and it is significantly effective in the field of silane crosslinking.

On the other hand, in Comparative Example 1 in which dibutyltin dilaurylate as an organotin compound is used, the appearance of the insulating cover layer and the gel fraction are both satisfactory but there is concern about environmental hormone, and it is thus regarded as unsatisfactory from the viewpoint of the environmental responsiveness.

Comparative Examples 2 and 3, in which oleylamine and hardened tallow alkyl propanediamine as an amine compound, not a guanidine derivative, are used as a silanol catalyst, have a gel fraction of less than 70% after room temperature crosslinking and are thus rejected. This is because, since a reaction rate of an amine compound is slower than that of a strongly basic guanidine derivative, an amine compound used as a silanol catalyst sufficiently reacts as a crosslinking catalyst in vapor crosslinking (leaving at 80° C. and 95% RH for 24 hours) but does not sufficiently react in room temperature crosslinking (leaving at 25° C. and 65% RH for 7 days). It is understood that Comparative Examples 2 and 3 are inferior to the guanidine derivative of the invention which exhibits sufficient crosslinking characteristics even in a state being left in a room temperature atmosphere.

Meanwhile, even though the crosslinking promoter of the invention is blended, Comparative Example 4 with the addition of less than the defined amount shows a result that the gel fraction after the room temperature crosslinking is low, and Comparative Example 5 with the mixed amount of more than the defined range shows a result that the extrudate appearance is unsatisfactory.

In Comparative Example 6 in which a guanidine derivative having a boiling point of 161° C. and a melding point of −30° C. in an environment at 760 mmHg is used as a silanol catalyst, voids were generated in the insulating cover layer due evaporation at the outlet port of the extruder since the boiling point in an environment at 760 mmHg is less than 170° C. which is out of the defined range in the invention, and thus, the result is unsatisfactory.

In Comparative Example 7 in which a guanidine derivative having a boiling point of not less than 200° C. and a melding point of 207° C. in an environment at 760 mmHg is used as a silanol catalyst, the derivative was not uniformly dispersed in the material of the insulating cover layer during kneading since the melting point in an environment at 760 mmHg is more than 190° C. which is out of the defined range in the invention, and thus, the results of the gel fraction are unsatisfactory for both after the vapor crosslinking and after the room temperature crosslinking.

It is clear that Examples have better characteristics than those of Comparative Examples, hence, the effects of the invention are obvious.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A silane-crosslinked polyolefin insulated wire, comprising:
   a conductor; and
   an insulating cover layer extruded on an outer periphery of the conductor,
   wherein the insulating cover layer comprises a silane-crosslinked polyolefin to be cross-linked by reacting water with a polyolefin having an alkoxysilyl group as a side chain, and
   wherein the insulating cover layer further comprises a guanidine derivative having a boiling point of not less than 170° C. and a melting point of less than 190° C. in an environment at 760 mmHg as a crosslinking promoter to promote crosslinking of the polyolefin in an amount of not less than 0.05 parts by mass and not more than 0.5 parts by mass per 100 parts by mass of the polyolefin.

2. The silane-crosslinked polyolefin insulated wire according to claim 1, wherein the boiling point of the guanidine derivative is not less than 200° C. in an environment at 760 mmHg.

3. The silane-crosslinked polyolefin insulated wire according to claim 1, wherein a gel fraction of the insulating cover layer is not less than 70%.

4. The silane-crosslinked polyolefin insulated wire according to claim 2, wherein a gel fraction of the insulating cover layer is not less than 70%.

* * * * *